United States Patent
Clore et al.

(10) Patent No.: US 6,389,293 B1
(45) Date of Patent: May 14, 2002

(54) METHOD AND APPARATUS FOR PROVIDING CALL SCREENING ON CORDLESS TELEPHONE EQUIPMENT USING THREE-WAY CALLING

(75) Inventors: Stephen J. Clore, Salinas; Ronald E. Anglikowski, Morgan Hill; Mark C. Jensen, Morgan Hill; James E. Sieffert, Morgan Hill, all of CA (US); William Eisenloeffel, San Antonio, TX (US)

(73) Assignee: Cidco Communications LLC, Morgan Hill, CA (US)

( * ) Notice: Subject to any disclaimer, the term of this patent is extended or adjusted under 35 U.S.C. 154(b) by 0 days.

(21) Appl. No.: 09/568,530

(22) Filed: May 9, 2000

(51) Int. Cl.[7] .................................................. H04Q 7/20
(52) U.S. Cl. ........................ 455/462; 455/412; 455/426; 455/194.1; 379/102
(58) Field of Search ................................ 455/462, 412, 455/413, 444, 415, 426, 194.1; 379/102, 188, 100.16, 93.33, 217

(56) References Cited

U.S. PATENT DOCUMENTS

| | | | | |
|---|---|---|---|---|
| 4,881,259 A | * | 11/1989 | Scordato | 379/88 |
| 5,062,133 A | * | 10/1991 | Melrose | 379/102 |
| 5,388,149 A | * | 2/1995 | Lynn et al. | 379/61 |
| 5,737,394 A | * | 4/1998 | Anderson et al. | 455/412 |
| 5,742,905 A | * | 4/1998 | Pepe et al. | 455/461 |
| 5,752,191 A | * | 5/1998 | Fuller et al. | 454/445 |
| 5,758,281 A | * | 5/1998 | Emery et al. | 455/428 |
| 5,987,318 A | * | 11/1999 | Alperovich et al. | 455/416 |
| 6,097,964 A | * | 8/2000 | Nuovo et al. | 455/550 |
| 6,101,249 A | * | 8/2000 | Weber | 379/188 |

* cited by examiner

Primary Examiner—William Trost
Assistant Examiner—Tilahun Gesesse
(74) Attorney, Agent, or Firm—Pennie & Edmonds LLP

(57) ABSTRACT

A cordless telephone includes a ring detector state machine module to facilitate the answering of a call received at the cordless telephone. A screening state machine module enables three-way connection and aural monitoring of the incoming call on the cordless telephone.

2 Claims, 11 Drawing Sheets

METHOD AND APPARATUS FOR PROVIDING CALL SCREENING ON CORDLESS TELEPHONE EQUIPMENT USING THREE-WAY CALLING

BRIEF DESCRIPTION

The subject of this invention relates to the telephony industry. Specifically, this invention concerns implementation of incoming call screening on a customer premises equipment (CPE) for subscribers of a central voicemail service.

BACKGROUND OF THE INVENTION

Call screening refers to a called party's ability to aurally monitor a calling party without the calling party knowing that they are being listened to. Typically, called parties, or users, who desire such a function as call screening must use a telephone answering device (TAD), some other device such as a personal computer (PC), a live attendant, or a combination of these methods to provide the screening activity. The present invention stems from the need for a more cost effective and user efficient method of implementing the call screening function.

The use of dedicated call screening equipment such as a PC or a private branch exchange (PBX) requires significant investment in capital equipment and, in many cases, an attendant to qualify, or screen and transfer incoming calls. These methods, while successful, have limitations and/or disadvantages. For example, the hardware and software associated with dedicated equipment can be expensive. Additional costs such as salaries and maintenance fees can be high as well, adding to the overall cost of ownership. While a TAD offers the screening function at a reasonably low cost, it does so at the expense of user efficiency and flexibility. This is so because the user must be in close physical proximity to the TAD in order to listen to the incoming call, thus the TAD method suffers from a lack of user flexibility by limiting use of the call screening function to a specific location.

As a result of the breakup of AT&T in 1983 due to Federal antitrust action, the elimination of Bell Telephone as the single telephone service provider created several regional telephone service providers. Responding to increasing consumer competition these regional providers, referred to as the "Baby Bells," began to offer services other than basic telephone connection. One of these services was a central office (CO) voicemail service. This centrally operated service allowed subscribing users to receive voicemail without the need for any special equipment at their premises. A plain old telephone service (POTS) CPE was all that was required, greatly reducing the cost of ownership for a voicemail service.

To use the service a user simply dialed into their account and operated the central system via a set of commands. The user could listen to messages, save, delete, forward or otherwise manipulate messages from their premises. However, use of the centrally served voicemail had a disadvantage. The user could no longer listen to the message, or screen calls as they were being left, an important capability available with a TAD or other call screening method.

As mentioned briefly above, there are at present a number of methods for accomplishing the call screening function in use, including CO based call screening service using centrally operated voicemail. For example, in one method, as long as the screening function is enabled by the user, the CO redirects all incoming calls to the user's central voicemail service. When an incoming call is received the CO signals the user, who then must enter a dual tone multi-frequency (DTMF) code if he wishes to take the call. Thus a significant disadvantage of this method is the necessity for the user to enter a code each time he wishes to selectively screen a call. Obviously, errors in entry of the code or failure to react to the CO signal will cause the user to lose the opportunity to screen an incoming call.

In a second method the screening function, if selected by the user, is enabled via a radio link to the user's cordless CPE. Disadvantageously, however, this method only works for incoming calls supporting caller identification (CID) and requires that the user pre-program a table containing all callers that are to be screened. Thus this method suffers from the dual disadvantages of increased complexity, i.e. the need to program numbers to be screened, and reduced user flexibility, i.e. the inability to screen calls not supported by CID.

Yet a third method presently in use involves the use of a TAD to accomplish a switching function in the user's premises. With this method the TAD is placed between the user's CPE and the public telephone line. An incoming call may be screened at any time by entry of a code by the user. A second public telephone line must also be attached to the TAD in order for the method to create a three-way call between the calling party, the user, and the CO. This method suffers from numerous disadvantages. First, two separate incoming public telephone lines are required, increasing the expense and complexity of the method. Second, each extension CPE within the user's premises must be attached to a separate port on the TAD thereby increasing wiring cost, complexity, and the resultant decrease in reliability. Third, the screening function is not automatic. Each time the user wishes to screen an incoming call, a code must be entered which hampers efficient call screening activity.

As can be seen, all of the current methods suffer from one or more drawbacks. A further drawback common to all of the present methods is the inability to use the screening function with a cordless phone. A better method would be to provide a way for the user's CPE to automatically establish a three-way call between the calling party, the user and the user's central voicemail service without the need or any user intervention or special equipment. A further improvement would be for that method to allow use with cordless phones.

SUMMARY OF THE INVENTION

A cordless telephone includes a ring detector state machine module to facilitate the answering of a call received at the cordless telephone. A screening state machine module enables three-way connection and aural monitoring of the incoming call on the cordless telephone.

DETAILED DESCRIPTION OF PREFERRED EMBODIMENTS

As described briefly above, there are a number of disadvantages with the current methods for call screening, either locally using a device such as a TAD, a PBX, or through a central voicemail service. Primary among these are the need for user intervention to enable screening, the need to be at or near the screening device, and the expense and complexity associated with multiple telephone lines and extension wiring. The present invention overcomes these disadvantages by providing a method for automatically enabling incoming call screening by establishing a three-way connection with the user's central voicemail service. Once the screening function has been configured, either locally at the user's CPE or remotely at the CO, the function is always available and allows the user the flexibility to screen or intercept the call with no special action required. Thus the method of the present invention overcomes the lack of flexibility and wiring complexity disadvantages of other methods at a cost similar to the TAD method.

The method of the present invention further overcomes the disadvantages enumerated above by providing the incoming call screening function using standard telephony signaling techniques, thus no special hardware is required. Advantageously, the present invention has the ability to recognize different incoming signal types, activating the call screening function only when a normal incoming call is received. Thus when a message waiting signal is received from the CO, for example, the method of the present invention does not activate call screening, but allows the CPE to respond as it normally would to this type of signal.

Figure 1:
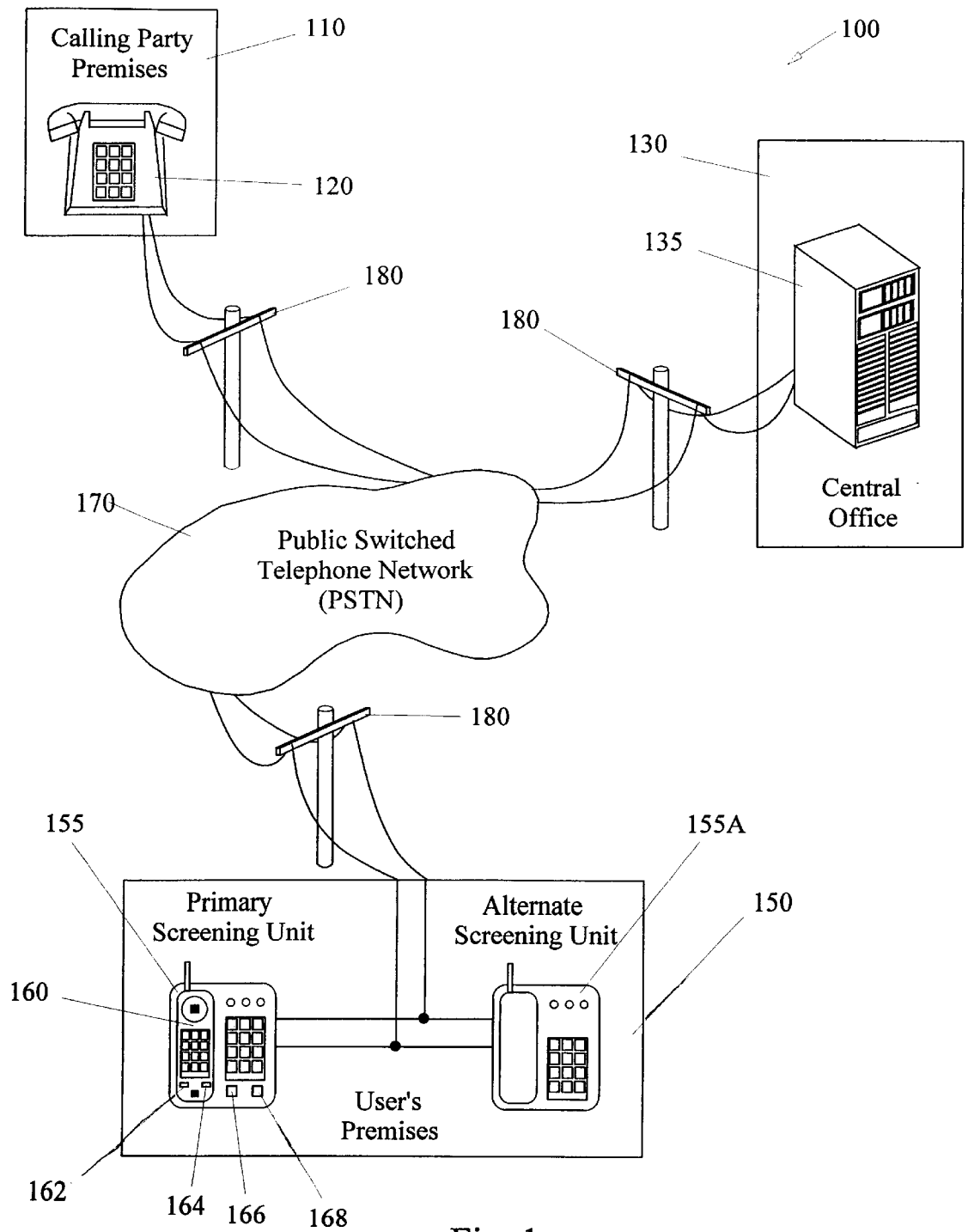
FIG. 1 is a high level block diagram of a system which can make use of the method of the present invention.

For a more complete understanding of the method of the present invention, it is necessary to first describe the environment in which the invention operates. Referring to FIG. 1, a high-level block diagram 100 of a typical system that can make use of the method of the present invention is shown. A user's premises 150 contains a Primary Screening Unit (PSU) 155 and an Alternate Screening Unit (ASU) 155A. A screening unit is the PSU if it is the device programmed by the user to be the first to engage the screening function and will have a hook switch 160 and may have a speaker switch 166 and/or a mute switch 168 if the device is of the type normally equipped with such switches. However, while all CPEs must have a hook switch 160, it is not necessary for any screening unit to have either a speaker switch 166 or a mute switch 168. If the screening unit is of the cordless type, the handset may have a handset mute switch and a talk switch that perform essentially the same functions as their counterparts on the PSU device 155 in FIG. 1. In any case, these switches perform functions well understood by those of skill in the art.

Both of these screening devices are connected in parallel to telephone lines 180, which are part of the public switched telephone network (PSTN) 170. Note that while the present invention makes use of a combination of two CPE devices, both of which are base station, or corded type telephone equipment, as is known to those skilled in the art, this is not the only possible CPE device configuration that may take advantage of the method of the present invention. For example, one or more of the CPE devices could be a cordless type telephone. Further, as will be discussed in detail below, only the PSU need contain the processing intelligence for the method of the present invention.

Also connected to the PSTN 170 via similar telephone lines 180 are the CO 130 and the calling party's premises 110. The CO 130 has a central switch 135 that contains, among other functions, the user's central voicemail service. In one embodiment of the present invention, the central switch 135 further contains the necessary intelligence to implement the method of the present invention. The calling party's premises 110 contains a telephone equipment 120 used to initiate a call to the user.

Figure 2:
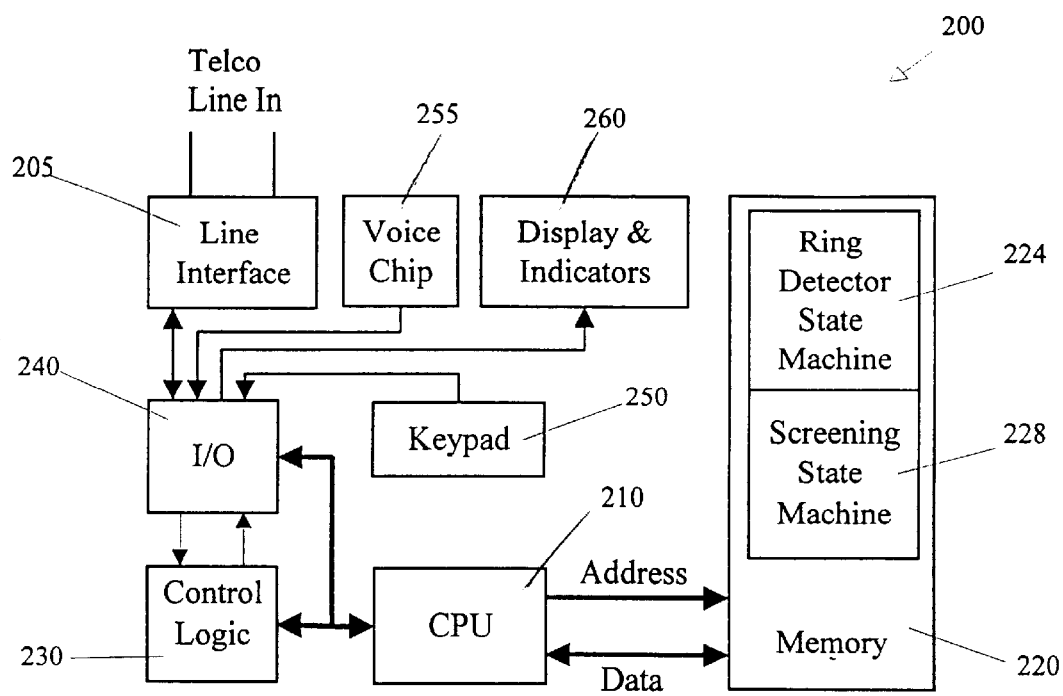
FIG. 2 is a detailed block diagram of a typical user premises CPE which can make use of the method of the present invention.

Referring now to FIG. 2, a detailed block diagram 200 of a CPE device that can typically make use of the method of the present invention is show. In this first embodiment of the present invention a CPE device that is a corded type telephone equipment is used, but as is known to those skilled in the art, the method of the present invention may be implemented in a number of different CPE devices, for example, a TAD, a PC, or other systems comprised of the requisite hardware and software. Note that there are numerous corded telephone devices that could make use of the present invention including a speakerphone or a stationary telephone with a standard handset. The balance of the discussion of the first embodiment of the present invention assumes the corded device is a speakerphone, however, this should not be read as a limitation on the scope of the invention.

In FIG. 2 a CPU 210 is connected to a memory 220 via address and data buses in a manner well understood by those of skill in the art. The memory 220 contains, among other data, a ring detector state machine 224 and a screening state machine 228. These two state machines supply the necessary intelligence in the form of process code to implement the method of the present invention and are discussed in detail below. However, as is known to those of skill in the art, state machines are only one possible method for representing the instructions stored in memory used to accomplish functions in a digital device such as that shown in FIG. 2 thus should not be read as a limitation on the method of the present invention.

Also appearing in FIG. 2 are control logic circuits 230 and input/output circuits (I/O) 240. Each of these functional blocks accomplishes those I/O tasks associated with the operation of a digital device and will be well understood by those skilled in the art. Line interface 205, display and indicators 260 and keypad 250 also provide functions well known to those skilled in the art. Voice chip 255 is used to play an outgoing message in response to an incoming call that has been answered by the user's CPE. In one embodiment the chip is a C5212 from General Integrated Systems, San Jose, Calif., USA.

As described above, the method of the present invention establishes a three-way call between the calling party, the user, and the user's central voicemail service. This three-way connection is created after an outgoing voice message (e.g. "Please hold while we complete your call") has played informing the calling party that the call is being transferred. In reality the call is being connected to the user's voicemail but, as is known to those skilled in the art, any combination of outgoing message and connection point may be used without departing from the spirit of the invention.

Figure 3:
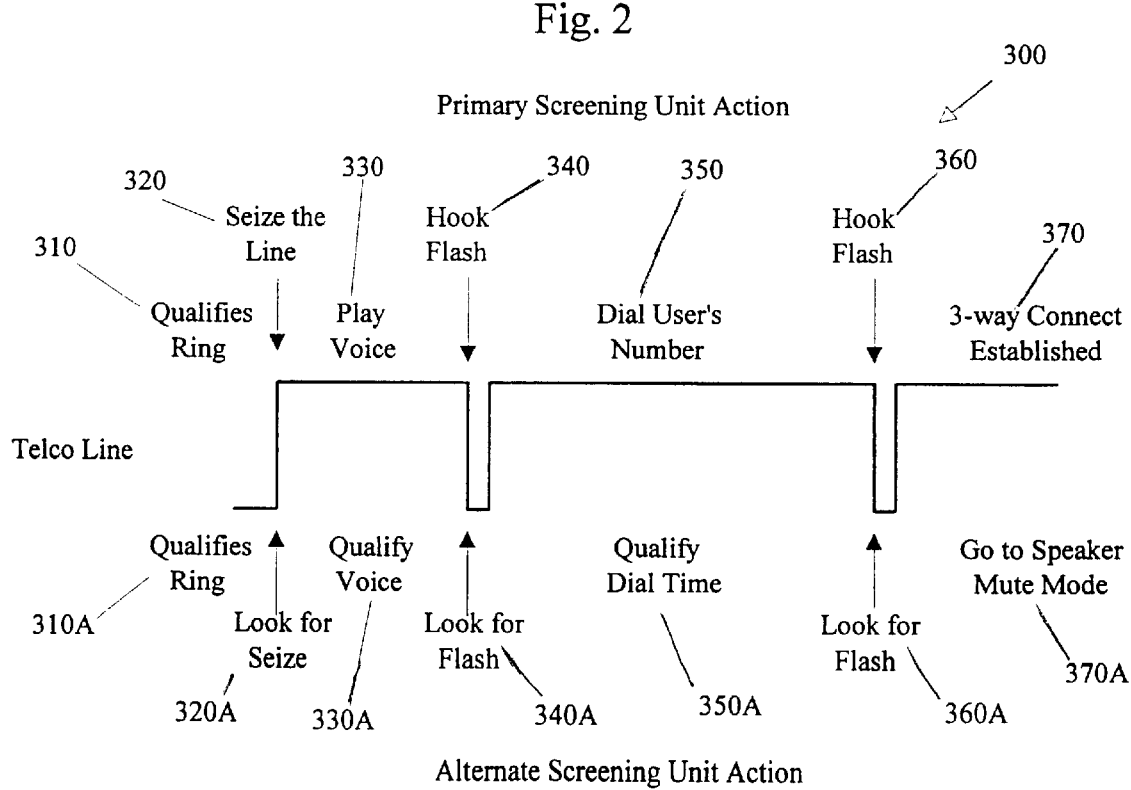
FIG. 3 illustrates Primary/Alternate screening unit actions on a telephone line using the method of the present invention.

FIG. 3 depicts a series of actions 300 showing the reaction of the PSTN to the method of the invention. The upper series of actions 310 to 370 are completed by the Primary Screening Unit (PSU) 155 in FIG. 1, while the lower series of actions 310A to 370A are completed by the Alternate Screening Unit (ASU) 155A of FIG. 1. Note that there may be more than one ASU without departing from the spirit of the invention.

When an incoming call is received, the PSU qualifies the incoming ring at 310. At the same time the ASU also qualifies the ring at 310A in case it is the unit that the user takes off hook to intercept the call. Ring qualification is needed to allow the type of incoming call to be determined and is accomplished using a series of software timers in a way well understood by those of skill in the art. For example, the incoming call may be a message waiting ring signal, which is a series of two short rings approximately 0.8 seconds in duration separated by approximately 0.4 seconds, compared to a single approximately 2.0 second ring for a normal incoming call. The screening units must be capable of recognizing special incoming ring signals as something other than a call that requires screening.

Having qualified the incoming ring as a call requiring screening, at 320 the PSU seizes the line and at 330 begins playing the outbound voice message telling the caller that the call is being transferred. At the same time the ASU monitors the line looking for a line-in-use condition at 320A. Upon seeing the line seizure, the ASU qualifies the time required to complete the outgoing message at 330A. After the outgoing message has completed the PSU flashes the line at 340. The CO reads the flash and places the calling party on hold. Once on hold the PSU then dials the user's central voicemail service at 350. During the same period of time the ASU looks for the flash at 340A and then qualifies the time needed to complete the connection to the central voicemail service at 350A. After the connection to the central voicemail service has been made, the PSU again flashes the line at 360, and, as with the first flash, the ASU looks for the second flash at 360A. Once the second flash has completed at 370, the three-way call is established and both the PSU and ASU go to the speaker mute mode at 370A. At this point the user can hear the calling party without the calling party's knowledge and has the option of intercepting the call from either the PSU or the ASU by simply taking the device off hook.

Figure 4:
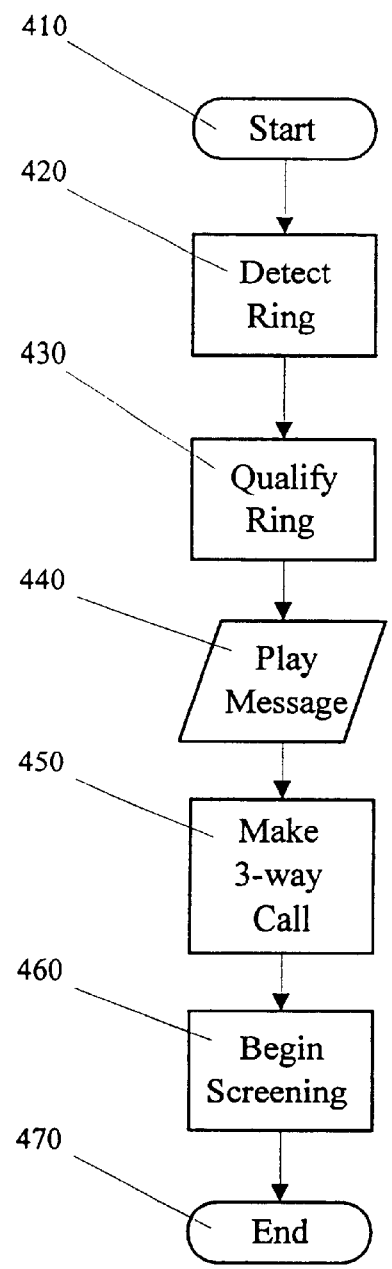
FIG. 4 illustrates a top level flow chart of the process implemented by the method of the present invention.

The method for establishing call screening discussed above is accomplished by operational code stored in the memory of the PSU. The operational code may be described in detail through a discussion of the state machines appearing in FIGS. 5 through 7 in conjunction with FIG. 3 above, however, FIG. 4 provides a top level flow chart 400 of the method of the present invention. As shown, the process is in the Idle state at step 410 when a ring is received at the user's CPE indicating the presence of an incoming call. In step 420 the ring is detected by the CPE or CO, depending on the embodiment, and at step 430 the ring is qualified to insure that it is truly an incoming call subject to the screening function. An example of a ring that is not an incoming call would be a message waiting ring.

Once qualified as an incoming call, an outbound voice message is played at 440 telling the calling party that their call is being transferred. After the outgoing message has played a three-way call is established at step 450. This is accomplished by flashing the line a first time, dialing the user's central voicemail service, then flashing the line a second time. When the three-way call has been established call screening commences as at step 460. Screening may be terminated in a number of ways, for example, the user intercepting the call, but in any case the process returns to the Idle state at 470 where it waits for the next incoming call.

Figure 5:
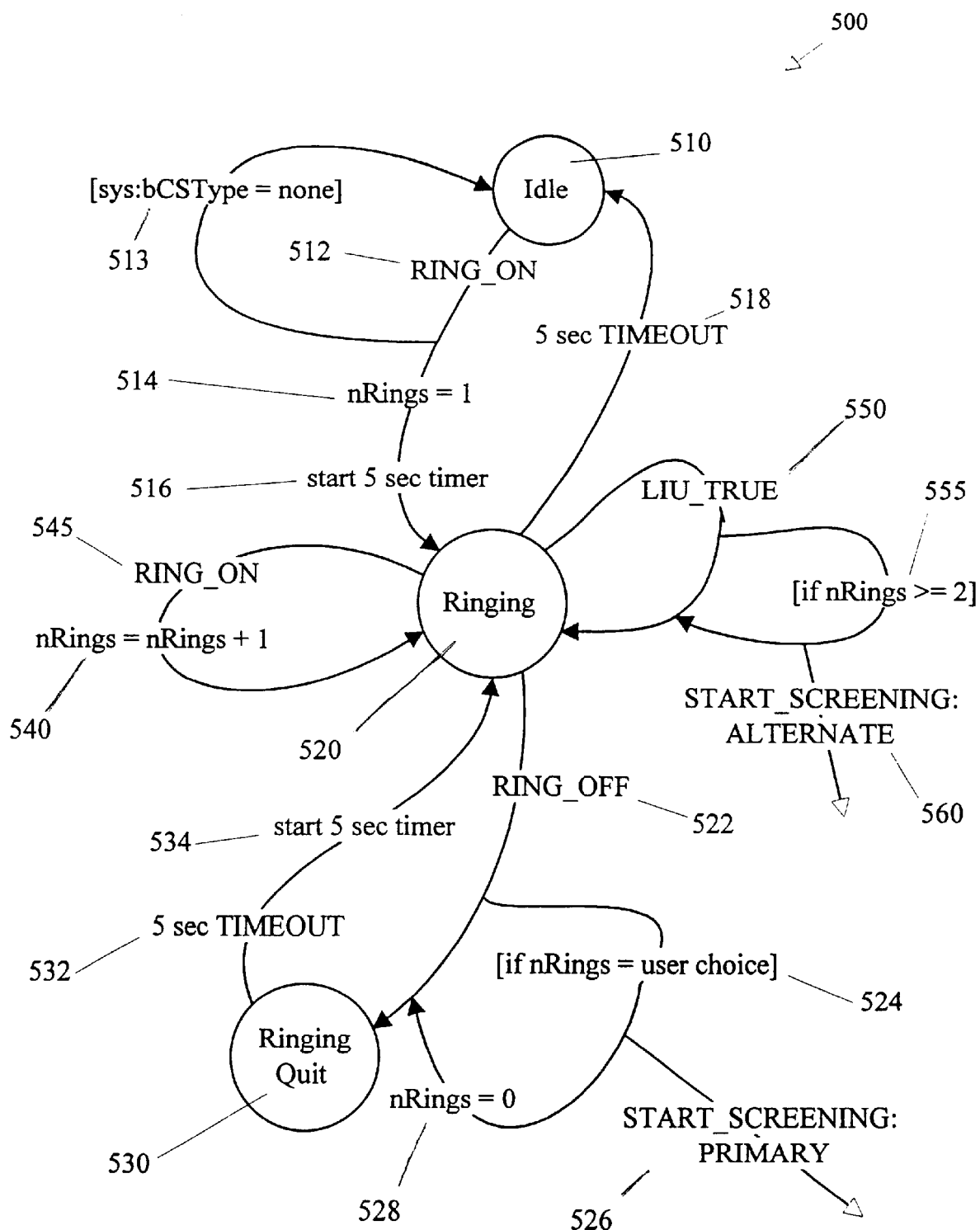
FIG. 5 illustrates a ring Detector state machine of a CPE embodiment which can make use of the present invention.
Figure 6A:
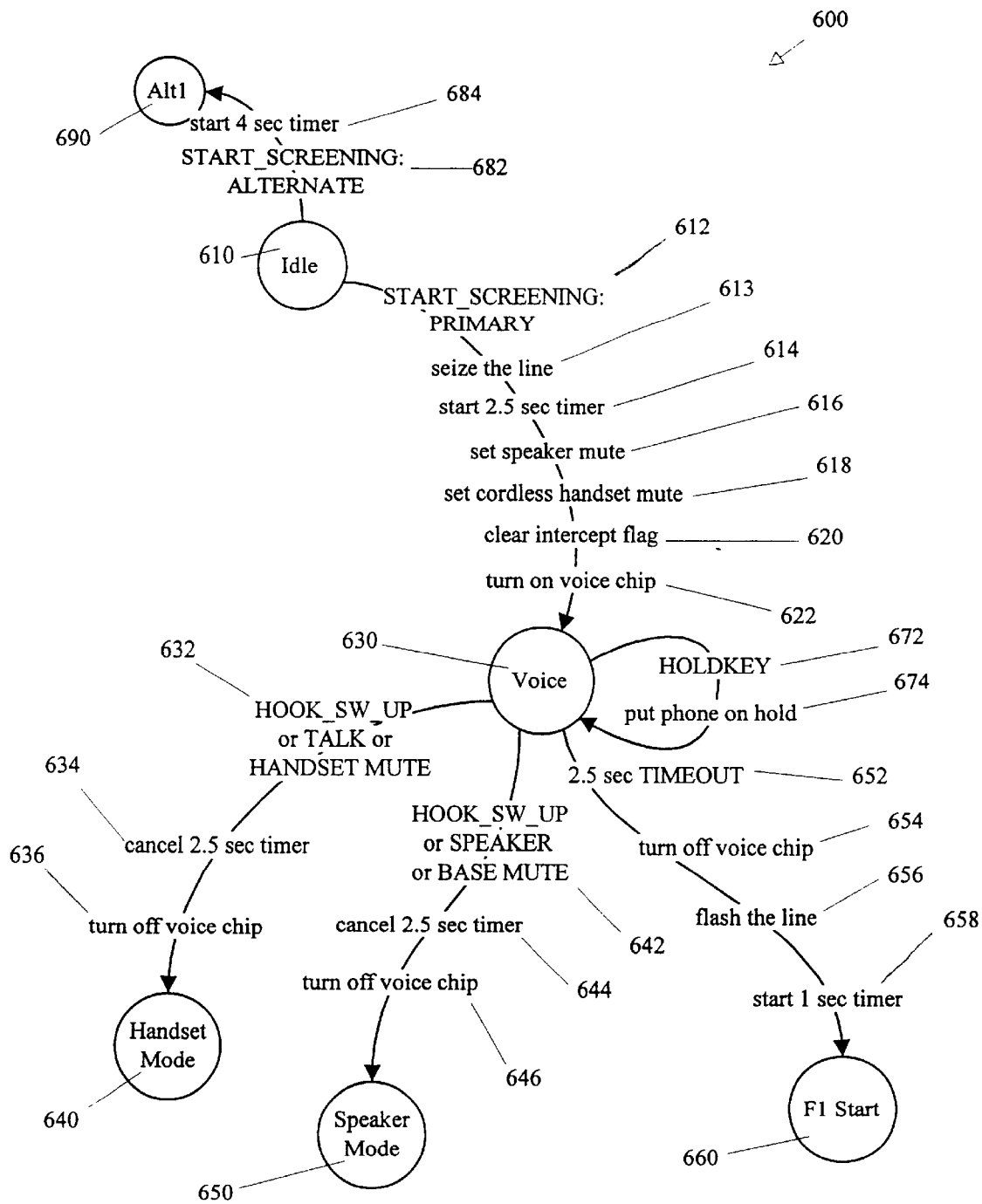
FIGS. 6A, 6B, 6C, 6D, 6E and 6F: illustrates a Screening state machine of a CPE embodiment which can make use of the present invention.
Figure 6B:
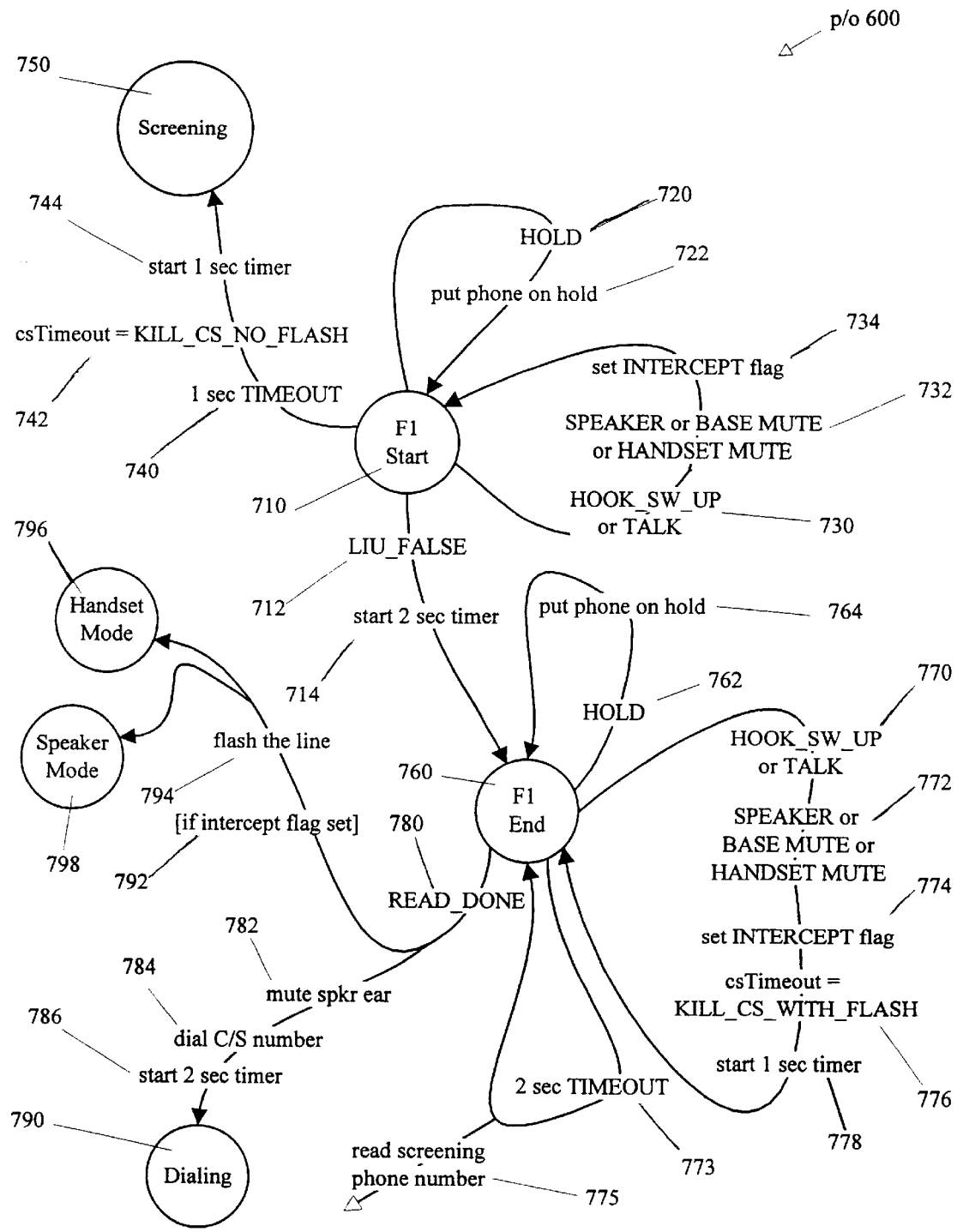
Figure 6C:
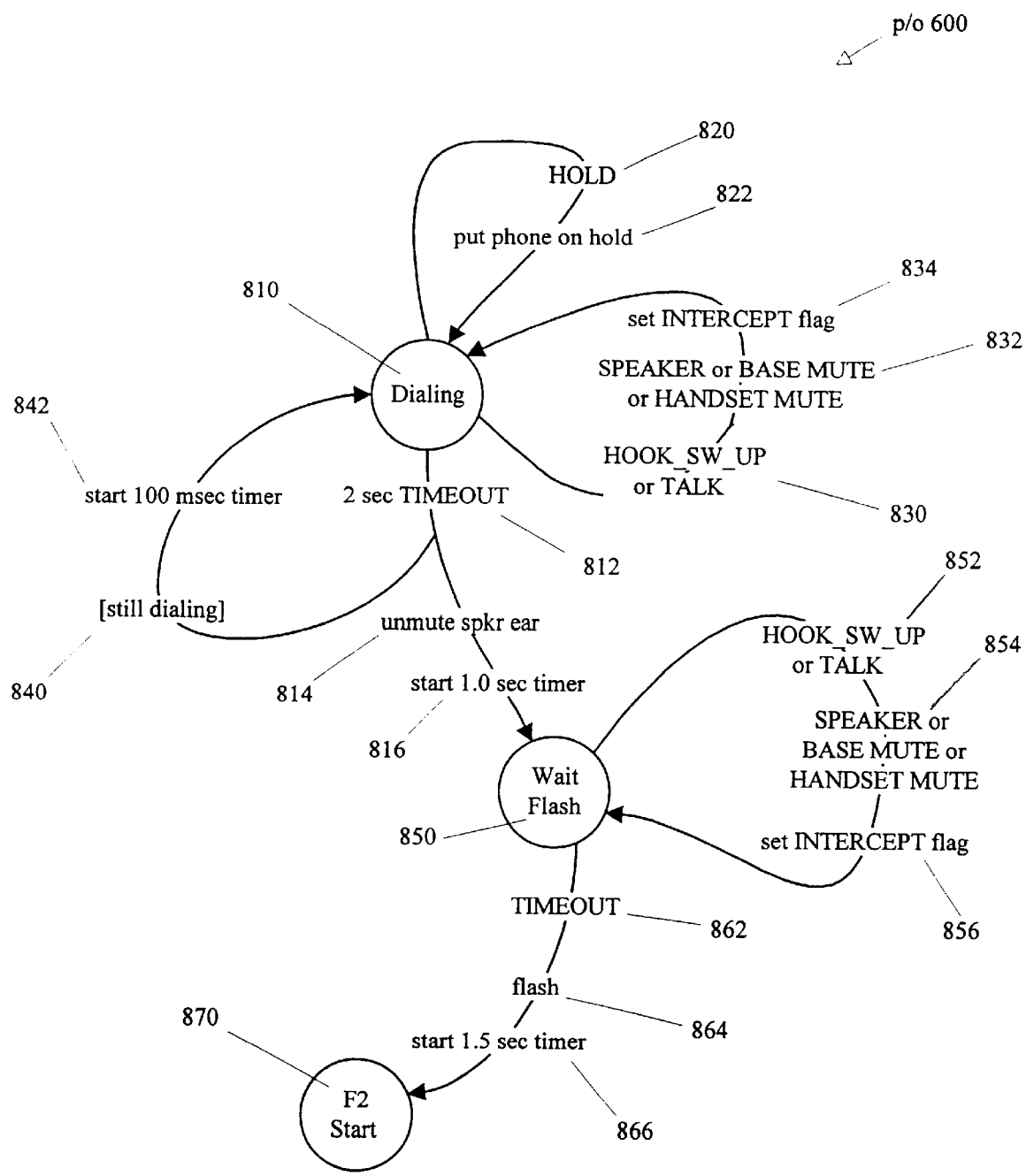
Figure 6D:
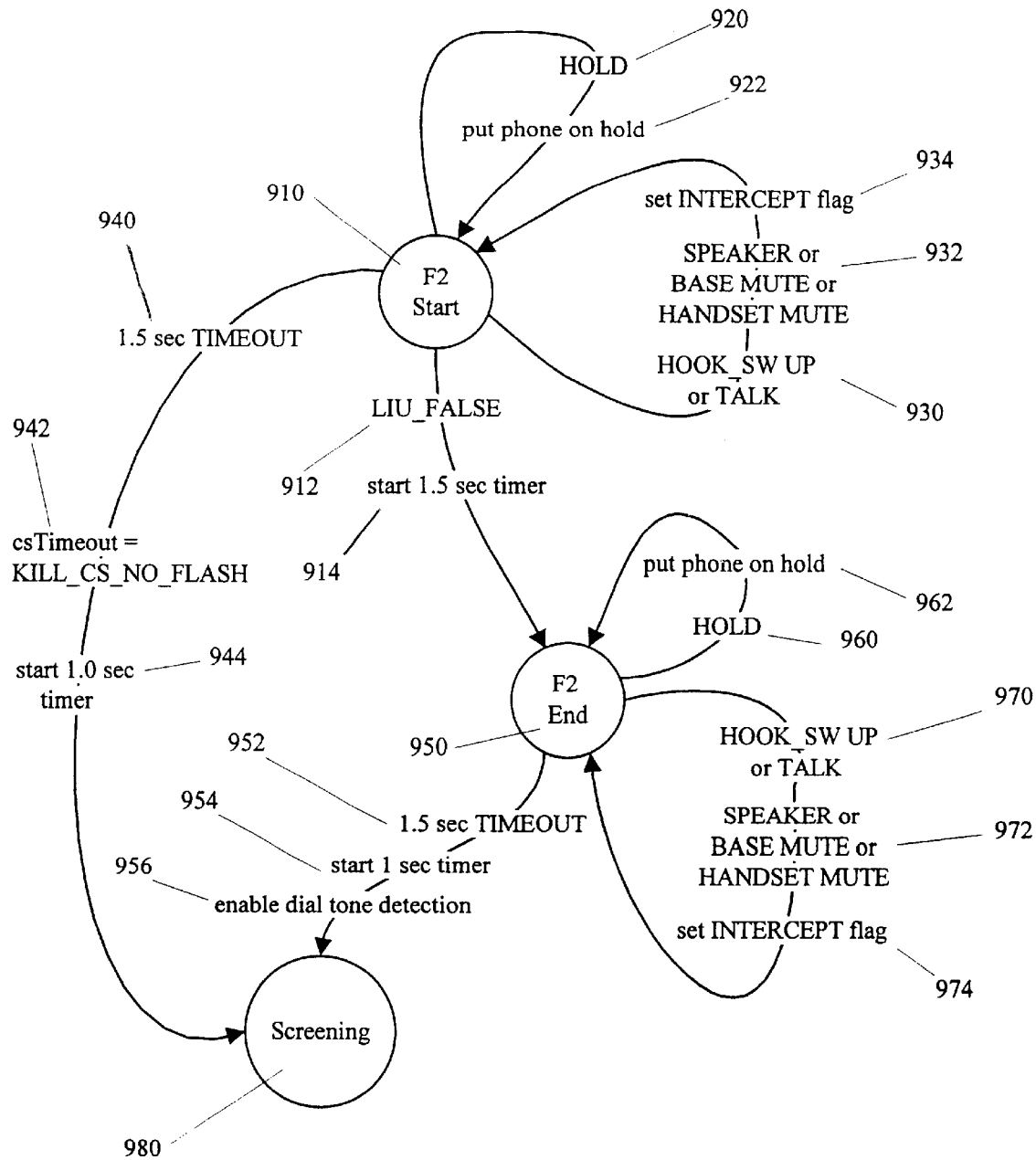
Figure 6E:
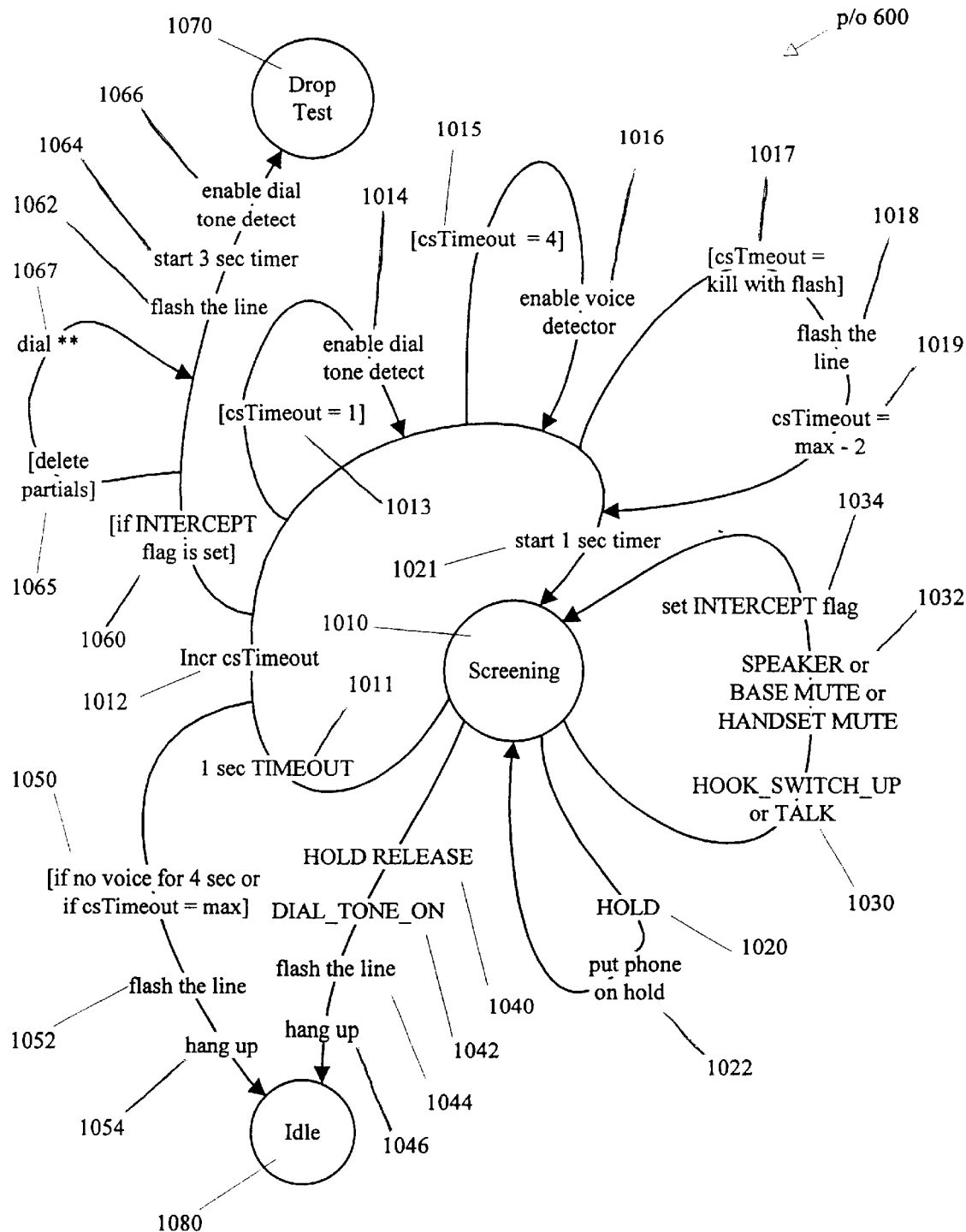
Figure 6F:
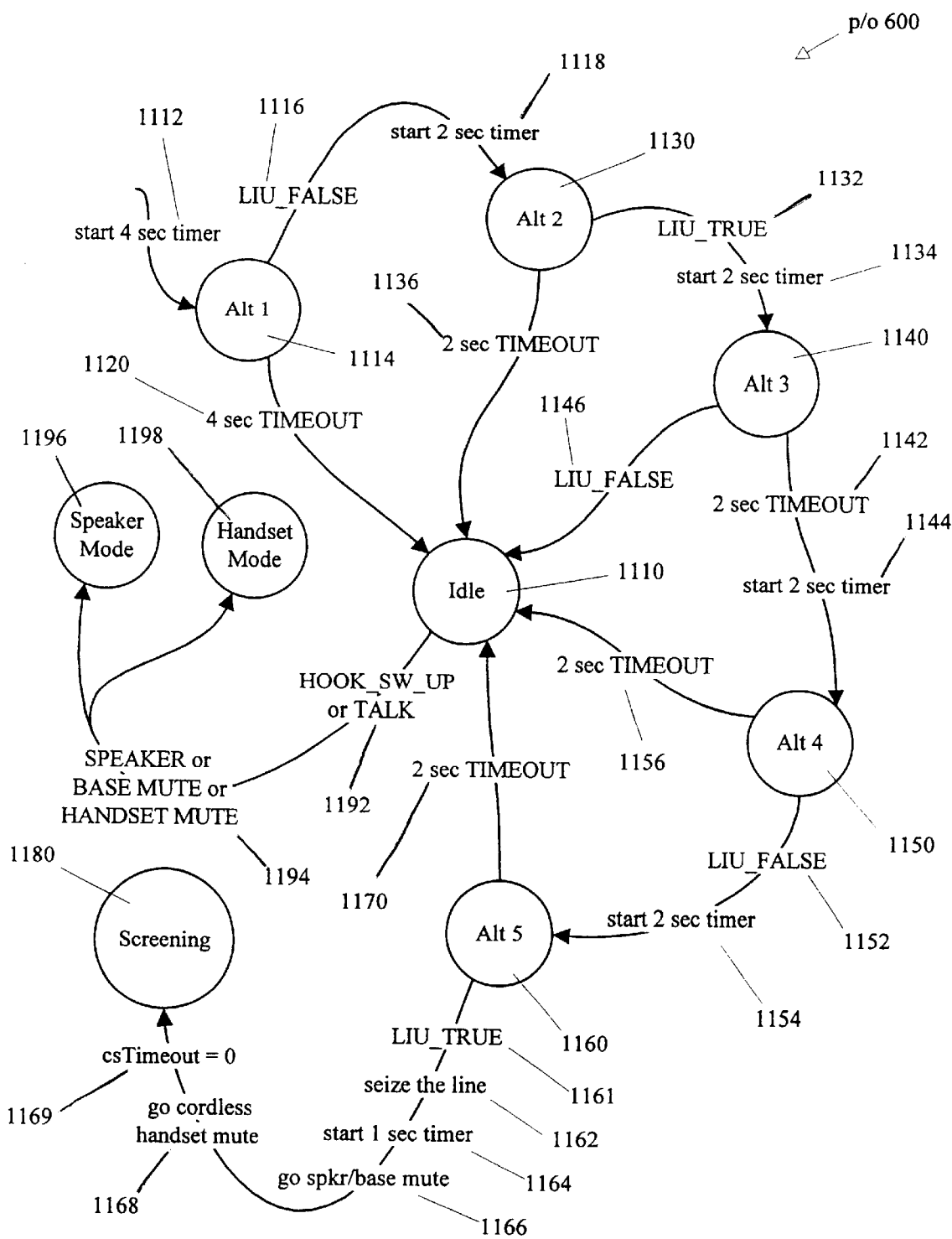
Figure 7:
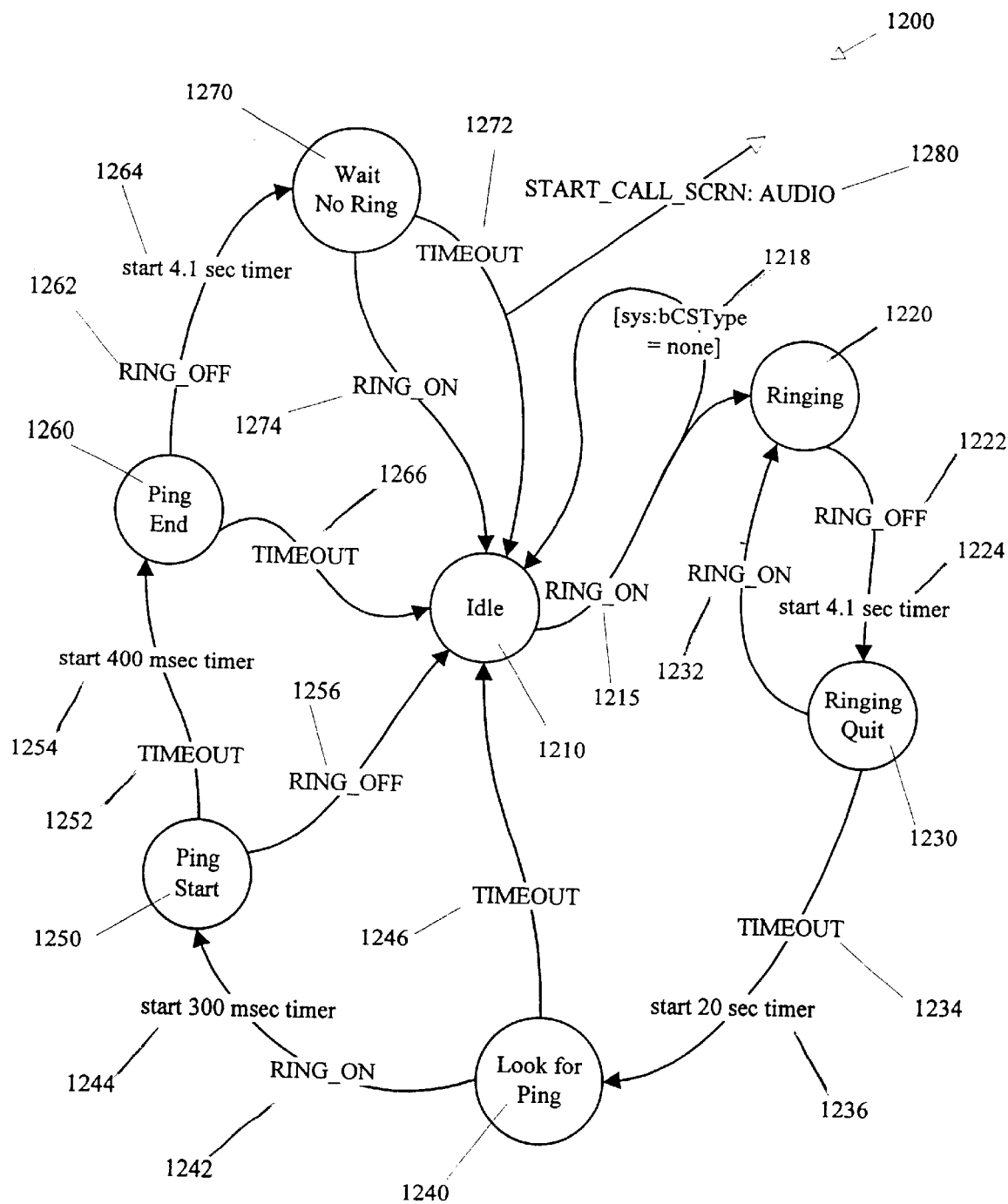
FIG. 7 illustrates a Ring Detector state machine of a CO embodiment which can make use of the present invention.

The balance of the detailed discussion of the method of the present invention centers on the state machines appearing in FIGS. 5 through 7. For the remainder of the discussion, where a timer is described, it may be assumed to have an accuracy of +/−2.0 milliseconds unless specifically stated otherwise. Signal and event names appear in sans-serif font, for example, START_SCREENING.

Beginning with FIG. 5, the CPE based ring detector state machine 500 is shown. Note that the difference between the CPE based embodiment of the present invention and the CO based embodiment lies in the detail of the ring detector state machine. The CPE embodiment will be covered here while the CO embodiment will be described in detail later in the discussion. The ring detector state machine is in the Idle state at 510 when an incoming ring is received. A RING_ON signal is generated at 512 and, if the user has enabled the call screening function, a sys:bCSType=none event 513 occurs and the process returns to Idle. Absent the occurrence of the sys:bCSType=none event 513 a ring counter nRings is set to one at 514. At 516 a 5.0 second timer is started and the Ringing state 520 is entered. When ringing has ceased, a RING_OFF signal is generated at 522 and the Ringing Quit state is entered at 530 unless an if nRings=user choice event 524 occurs indicating that the number of rings in the ring counter nRings is equal to the user's preset number of rings. If this occurs a START_SCREENING:PRIMARY signal is generated at 526, the Ringing state is exited, and the ring counter nRings is reset to zero at 528.

The 5.0 second timer started at 516 times out and generates a TIMEOUT signal at 532. The purpose for this timer is to provide a ring qualification time window of sufficient length to mask distinctive ring cadences such as the message waiting signal described above. The 5.0 second timer is then restarted at 534 and the Ringing state 520 is again entered. At this point the RING_ON signal is again generated in response to the next incoming ring signal, this time at 545, the ring counter nRings is incremented at 540 to reflect that the next incoming ring signal has occurred and the Ringing state 520 is reentered.

The process continues to alternate between the Ringing and the Ringing Quit states until either the user's preset number of rings has occurred or until the 5.0 second timer times out without reaching the preset number of rings at 518. If this occurs, the process returns to the Idle state at 510. However, at any time a phone is taken off hook a LIU_TRUE signal is generated at 550. This could occur, for example, if the user wished to intercept the call. If a LIU_TRUE signal is generated and if the ring counter nRings equals or exceeds two rings an if nRings>=2 event 555 occurs indicating that the user may wish to screen the call from an extension phone, thus a START_SCREENING:ALTERNATE signal is generated at 560 and the Ringing state is exited.

As with the ring detector state machine just described, the screening state machine 600 starts in an Idle state at 610, as shown in FIG. 6A. If the screening state machine receives a START_SCREENING:ALTERNATE signal, such as at 682, a 4.0 second timer is started at 684 and the Alt1 state is entered at 690. As will be discussed in greater detail below, at this point in the process a series of five sequential states begins to check for a LIU_TRUE signal, which could indicate that the user has elected to intercept the call at an extension CPE.

If a START_SCREENING:PRIMARY signal is generated, such as at 612, the line is seized at 613 and a 2.5 second timer is started at 614. In preparation for screening, speakerphone type CPEs are set to speaker mute mode at 616 and, in the case of cordless or non-speakerphone phones, at 618 the handset mute mode is set. At 620 the intercept flag is cleared, at 622 the voice chip is turned on and the Voice state is entered at 630. It is at this point that the method of the present invention is playing the outgoing message to the caller for approximately 2.5 seconds indicating that the call is being transferred. While the time for the outgoing message to play in the embodiments of the present invention is 2.5 seconds, it should be clear to those of skill in the art that more or less time may be used without departing from the spirit of the invention.

At 652 the 2.5 second timer has expired causing a TIMEOUT signal to be generated and the voice chip turned off at 654. The line is flashed at 656 and a one second timer started at 658. The 1.0 second timer is used to allow sufficient time for the CO to react to the flash and deliver a dial tone to the user's CPE. The process enters the Flash One (F1) Start state at 660 preparatory to checking to see that all user CPEs are on hook.

If the user intercepts the call at any time the screening process is halted. For example, if the user lifts the handset, presses the speaker key or the base mute key on a speakerphone type of CPE, a HOOK_SW_UP, SPEAKER, or BASE_MUTE signal respectively is generated at 642, the 2.5 second timer is cancelled at 644 and the voice chip is turned off at 646. The Speaker Mode state is entered at 650 and the user handles the call as a normal telephone conversation. In a similar manner, if the user lifts the handset of a cordless phone or a non-speakerphone type phone off of its cradle, or presses the talk or mute keys, a HOOK_SW_UP, TALK, or HANDSET_MUTE signal respectively is generated at 632. The 2.5 second timer is canceled at 634, the voice chip turned off at 636 and the Handset Mode state is entered at 640. As with the speakerphone example previously described, the user now engages in a normal telephone conversation with the calling party.

If at any time the user presses the hold key on any type of CPE, a HOLDKEY signal is generated at 672 and the phone is placed on hold at 674. In this way the user may allow the screening process to continue without hearing the incoming call. This permits the calling party to leave a message in the normal manner for later review by the user.

Turning now to FIG. 6B, the F1 Start and F1 End states are shown. Note that the F1 Start and F1 End states are part of the screening state machine 600. The F1 Start state 710 has been entered as a result of the flash generated at 656 in FIG. 6A. The purpose of this state is to verify that all user CPEs are on hook and that the line is not in use. If this condition exists, a LIU_FALSE signal is generated at 712, a 2.0 second timer is started at 714 and the F1 End state is entered at 760. However, if the user lifts the handset on a speakerphone type of CPE or presses the talk switch on a cordless type CPE a HOOK_SW_UP or TALK signal respectively is generated at 730 followed by a SPEAKER, BASE_MUTE or HANDSET_MUTE signal as appropriate at 732. The INTERCEPT flag is set at 734, the process will abort the dialing, select the proper audio path, flash the line and make a normal two-way connection.

If the user presses the hold key a HOLD signal is generated at 720 and the phone is placed on hold at 722. As was described above, this condition may exist if the user wished not to hear the incoming call. In this state, the call screening process continues and the calling party is able to leave a message in the user's voicemail in the normal manner. If the user has intercepted the call by picking up either an extension or the base CPE, the 1.0 second timer which was started at 654 in FIG. 6A will time out causing a TIMEOUT signal to be generated at 740. A csTimeout= KILL_CS_NO_FLASH event occurs at 742 followed by the start of a 1.0 second timer at 744 and the process returns to the Idle state 750.

Returning to the F1 End state at 760, and recalling that a 2.0 second timer was started at 714, at 773 the 2.0 second timer expires and at 775 the process begins the read of the user's voicemail service telephone number. At 780 a READ_DONE signal is generated indicating that the system has completed the read of the number. If the LIU_ FALSE condition exists, the handset speaker earpiece is muted at 782 and at 784 the user's voicemail number is dialed. A 2.0 second timer is started at 786 and the Dialing state is entered at 790. The 2.0 second timer started at 786 provides sufficient time to dial a seven or eleven digit outbound telephone number. If for some reason the intercept flag was set, as at 792, the line may be flashed at 794 and the appropriate telephone mode entered, for example, the Handset Mode 796 for a cordless type telephone or the Speaker Mode 798 for a speakerphone type telephone. The line is flashed at 794 to drop the line that would have been used to call the user's voicemail service, creating a normal two-way telephone call.

While in the F1 End state, if the user presses the hold key a HOLD signal is generated at 762 and the phone is placed on hold at 764. Again, as described above, this condition may exist if the user wished not to hear the incoming call. In this state, the call screening process continues and the calling party is able to leave a message in the user's voicemail in the normal manner.

If the user lifts the handset on a speakerphone type CPE the HOOK_SW_UP signal is generated at 770, followed by a SPEAKER or BASE_MUTE signal at 772. The INTERCEPT flag is set, as at 774, the process will abort the dialing, select the proper audio path, flash the line and make a normal two-way connection. In a similar fashion, if the user presses the talk button on a cordless type of CPE the TALK signal is generated at 770, followed by a HANDSET_MUTE signal at 772. In either case, the INTERCEPT flag is set, as at 774, the process will abort the dialing, generate a csTimeout=KILL_CS_WITH_FLASH signal at 776, start a one second timer at 778, select the proper audio path, flash the line and make a normal two-way connection. As will be discussed in detail below, the csTimeout counter may be forced to arbitrary states in order to direct process flow. At 776 the counter is forced to a state beyond the maximum allowed screening time value in order to force the process to abort the screening operation and enter a normal two-way call mode at 792.

Referring now to FIG. 6C, the Dialing state 810 is shown. Note that the Dialing state 810 is part of the screening state machine 600. The 2.0 second timer which was started at 786 in FIG. 6B times out at 812. At 814 the speaker in the handset is unmated and a 1.0 second timer is started at 816 in preparation for establishing a three-way connection, and the Wait Flash state is entered at 850. The 1.0 second timer is needed to allow enough time for the CO to be ready to accept the upcoming flash soon after the completion of the outbound dialing sequence. If for some reason the outbound telephone number has not completed the dialing process, a still dialing event 840 occurs, a 100 milli-second timer is started at 842 and the process again enters the Dialing state 810. This loop continues until the outbound number has completed the dialing sequence. Steps 820 through 834 operate in the same fashion and accomplish the same functions as steps 720 through 734 in FIG. 6B and are not discussed in detail here.

Returning now to the Wait Flash state 850, the 1.0 second timer started at 816 times out resulting in a TIMEOUT signal at 862. The line is flashed for a second time at 864, a 1.5 second timer is started at 866, and the Flash Two (F2) Start state is entered at 870. The purpose of the 1.5 second timer is to allow the CO enough time to recognize the second flash from the user's CPE. Steps 852 through 856 operate in the same fashion and accomplish the same functions as steps 820 through 834 discussed above and are not discussed in detail here.

The F2 Start state 910 and the F2 End state 950 are part of the screening state machine 600 and appear in FIG. 6D. Note that the process associated with steps 920 through 934 and 960 through 974 operate in the same fashion and accomplish the same functions as steps 820 through 834 discussed above and are not discussed in detail here. Recalling that a 1.5 second timer 866 in FIG. 6C was started just prior to entering the F2 Start state, if no user CPEs have been taken off hook a LIU_FALSE signal 912 occurs, followed by the start of a 1.5 second timer 914, and entry into the F2 End state 950. As with the F1 Start and End states [710 and 760 of FIG. 6B], the purpose of these states is to allow enough time for the CO to recognize and react appropriately to the flash sent by the user's CPE.

Exiting the F2 End state 950, the 1.5 second timer started at 914 times out at 952, followed by the start of a 1.0 second timer at 954. This 1.0 second timer is a general purpose clock that will keep track of the screening time and other call variables. The dial tone is enabled at 956 in order to determine if the calling party hung up during the second flash and the Screening state 980 is entered. At this point in the process the user is able to hear the calling party while a message is being left in the user's voicemail, and, as described above, may intercept the call at any time. Should the user intercept the call, a normal two-way connection will be established and the conversation will continue as a normal telephone call.

Returning briefly to the F2 Start state 910, if the LIU_FALSE signal 912 does not occur before the 1.5 second timer started at 866 in FIG. 6C expires, a TIMEOUT 940 occurs indicating that a user CPE has gone off hook. As a result, a csTimeout=KILL_CS_NO_FLASH signal 942 occurs, followed by the start of a 1.0 second timer 944. Once in the Screening state 980, the process determines how to react to the csTimeout=KILL_CS_NO_FLASH signal 942.

The Screening state 1010 in FIG. 6E is also part of the screening state machine 600. In this state the three-way call between the user's CPE [155 in FIG. 1], the user's central voice mail server [135 in FIG. 1] and the calling party's CPE [120 in FIG. 1] has been established and the user is actively screening the incoming call as the message is being left. The user may intercept the call at any time. Steps 1020 through 1034 operate in the same fashion and accomplish the same functions as steps 720 through 734 in FIG. 6B and are not discussed in detail here.

It is possible that the calling party disconnects at some point during the process of outgoing message playback or during outbound dialing to the central voicemail number. Recall that at the point where the second flash has ended establishing a three-way call between the calling party, the user's central voicemail and the user's CPE, a HOLD_RELEASE signal such as that shown at 1040 was generated. The dial tone detector is enabled by a DIAL_TONE ON signal at 1042. If a dial tone is detected the calling party has disconnected so the line is flashed at 1044, the user's CPE is hung up at 1046, and the process returns to the Idle state 1080.

During the time that the process is in the Screening state 1010, the process executes a loop in which a 1.0 second general purpose timer continuously expires at 1011 and is then restarted at 1021. The loop and timer are used to monitor the state of the process during screening activity. Each time the 1.0 second timer expires, the csTimeout counter 1012 is incremented. In this way, the process tracks the time spent in the Screening state 1010. For example, when the csTimeout counter equals one, the dial tone detector is enabled as a dial tone detector at 1014, but when the csTimeout counter equals four, the same dial tone detector is enabled as a voice detector, as at 1016. Note that the methods used to start, stop, count and monitor the 1.0 second timer are well known to those of skill in the art and are thus not discussed in detail here.

Beginning at 1011, when the 1.0 second timer has just expired, if there has been no voice activity for 4.0 seconds, or if the csTimeout counter has reached its maximum value, as at 1050, the line is flashed at 1052, the CPE is hung up at 1054 and the process returns to the Idle state 1080. Note that for the present embodiment csTimeout maximum is set at 180 seconds, equivalent to three minutes, however, as will be evident to those of skill in the art, other maximum values are possible without departing from the spirit of the invention. If the process branch conditions of 1050 are not present, the csTimeout counter is incremented at 1012.

If the INTERCEPT flag is set, such as at 1060, the user has elected to intercept the call. If the user chooses to delete any partial message that has been left, such as at 1065, the process dials a ** at 1067 to rewind the message (effectively erasing the partial message) otherwise the line is flashed at 1062, a 3.0 second timer is started at 1064, the dial tone detector is enabled at 1066 and the Drop Test state is entered at 1070. In the Drop Test state 1070 the voicemail system is disconnected, or dropped, and the appropriate audio path is selected in the same manner described in detail above.

After the first one second timer period csTimeout will equal one, such as at 1013. The dial tone detector is enabled at 1014 and the next three cycles are used to determine if the calling party has hung up. In this way the process is able to determine if the calling party's CPE went on-hook during some process event, for example, during the period that a flash was being sent to the CO. Upon the fourth cycle through the screening state process loop, the csTimout counter value will be four, as at 1015. At this point the dial tone detector is enabled as a voice detector at 1016 and is used to monitor the line for voice activity. This is done by stepping the dial tone detector through various narrow bands of voice frequency looking for low energy presence. If at any point the csTimeout=kill with flash condition occurs, as at 1017, the line is flashed at 1018 and the csTimeout counter is set to two seconds less than the maximum value, or 178 for this embodiment. The reason for this is that if the process must exit without issuing a flash, setting the csTimeout to 178 will force the exit in two seconds, or when csTimeout counter equals the maximum value of 180.

Turning now to FIG. 6F, and recalling FIG. 6A from above, at 682 a START_SCREENING:ALTERNATE signal was received, followed by the start of a 4.0 second timer 684. This series of actions resulted in entering the Alt1 state at 690. FIG. 6F provides the details of the alternate screening states Alt1 through Alt5, which are part of the screening state machine 600. While the present invention includes five alternate screening states, it should be recognized by those of skill in the art that more or less alternate screening states are possible without departing from the spirit of the invention.

After the Screening state machine receives a START_SCREENING:ALTERNATE event, such as at 682 in FIG. 6A, the 4.0 second timer has been stated at 1112 and the Alt1 state 1114 is entered. Note that the 4.0 second timer 1112 and the Alt1 state 1114 are the same as those shown in FIG. 6A [684 and 690 respectively], but are labeled differently here for clarity in the discussion. The 4.0 second timer allows sufficient time to determine if the PSU has released the line. If a LIU_FALSE event 1116 occurs prior to the expiration of the 4.0 second timer, a 2.0 second timer 1118 is started and the Alt2 state 1130 is entered. If the 4.0 second timer did expire prior to receiving the LIU_FALSE event 1116, a TIMEOUT 1120 occurs and the Idle state 1110 is entered.

Continuing now with the Alt2 state 1130, if a LIU_TRUE event 1132 occurs, the 2.0 second timer is restarted at 1134 and the Alt3 state 1140 is entered. This series of events indicate that the PSU has commenced the screening process and the outbound dialing to the user's voicemail is occurring. If the two second timer expired prior to the LIU_TRUE event, a TIMEOUT occurs at 1136 and the process returns to the Idle state at 1110. In the Alt3 state 1140 the process monitors extension phones to see if an ASU has gone off hook. If it has, the user has intercepted the call, a LIU_FALSE event occurs at 1146 and the process returns to the Idle state at 1110. However, if the 2.0 second timer expires, such as at 1142, the 2.0 second timer is again restarted at 1144 and the Alt4 state 1150 is entered. In this state the process is looking for a flash from the PSU as it sets up a three-way call between the user's CPE, the user's central voicemail server, and the calling party.

While in the Alt4 state 1150, if the 2.0 second timer expires a TIMEOUT event occurs at 1156, indicating that this is not a screening call, thus the process returns to the Idle state 1110. Upon the occurrence of a LIU_FALSE event 1152, the 2.0 second timer is again restarted at 1154 and the process enters the Alt5 state 1160. In the Alt5 state 1160 the process monitors the line to determine if the time between the LIU_FALSE event 1152 and the LIU_TRUE event 1161 is appropriate for a flash from the PSU. If not, the 2.0 second timer expires at TIMEOUT 1170 and the process returns to the Idle state 1110. If the LIU_TRUE event 1161 occurs before the 2.0 second timer expires, the primary unit has established the three-way call, and the process configures the CPEs, whether base or cordless, for screening. At 1162 the line is seized, a 1.0 second timer is started at 1164, the base unit is set to the speaker mute mode at 1166, the cordless CPE is placed in the handset mute mode at 1168, and the csTimeout counter, described above in the Screening state, is set to zero at 1169. The Screening state is then entered at 1180. Note that the Screening state 1180 is the same as the Screening state 1010 in FIG. 6E, but is labeled differently here for clarity of the discussion.

As with other states previously discussed, at any time the user may intercept the call. If the user decides to intercept the call, a HOOK_SW_UP or TALK signal will occur such as at 1192, followed by a SPEAKER, BASE_MUTE, or HANDSET_MUTE signal at 1194. Depending upon the type of CPE device intercepting the call, the appropriate audio path is selected and the process enters either the Speaker Mode 1196 or the Handset Mode 1198. Note that the methods used to react to the signals and select the proper audio path are identical to the same methods discussed in detail above, thus they are not discussed here.

The preceding discussion articulates the method of the present invention as implemented in a user CPE. However, the method may also be implemented at the CO. There are at present CO based call screening methods, but these have the several disadvantages that were enumerated above. The method of the present invention allows the CO based screening to be as flexible to the user as the CPE based method. For the CO based method, the Screening state machine is identical to and performs identical functions as in the CPE based method and is not discussed in detail here. The difference is, of course, that the Screening state machine is now located at the CO.

The main difference between CPE based and CO based screening methods is the Ring Detector state machine. The reason that the Ring Detector state machine must be different is that in the CO implementation of the method of the present invention, a ping ring, or ring splash, is used to indicate the presence of a calling party to the user. A ping ring is a short burst of approximately 500 milliseconds in duration. Since the incoming ring is different, a modified Ring Detector state machine is required to qualify the ring. In this method the user's phone first outputs a normal incoming call ring pattern: generally 2.0 seconds of ringing followed by 4.0 seconds of silence. Once the CO has established a connection between the calling party and the user's central voicemail, a ping ring is generated at the CO letting the user know that a message is being left. At this time the user may wish to screen the call, intercept the call, or allow the calling party to simply leave a message.

FIG. 7 shows the modified Ring Detector state machine 1200. From the Idle state 1210 a RING_ON event occurs at 1215, causing the Ringing state 1220 to be entered. If the sys:bCSType=none condition exists, the call screening function is being handled by the CPE, thus the process returns to the Idle state 1210. If the sys:bCSType=none condition does not exist, after the initial ring a RING_OFF event 1222 occurs, followed by the start of a 4.1 second timer at 1224. This timer is slightly longer than the 4.0 second off time of a normal ring signal. The Ringing Quit state 1230 is entered and the process waits for one of two events: either a TIMEOUT event 1234 from the 4.1 second timer or a new RING_ON event 1232. If a new ring is received at RING ON 1232, the call from the CO has not yet been connected to the user's central voicemail, thus the Ringing state 1220 is re-entered. However, if the TIMEOUT 1234 has occurred, the CO has transferred the call, a 20 second timer 1236 is started and the Look for Ping state 1240 is entered. The 20 second timer is set to be long enough to cover the delay before the CO outputs the ping ring. As is known to those of skill in the art, this delay could be more or less than 20 seconds without departing from the method of the invention.

In the Look for Ping state 1240 the process is waiting to determine if the calling party has disconnected. If the TIMEOUT at 1246 occurs, the CO has not sent a ping ring indicating that the calling party has hung up and the process returns to the Idle state 1210. If a RING_ON event 1242 is detected, a 300 millisecond timer 1244 is started and the process enters the Ping Start state 1250. Since the ping ring duration is approximately 500 milliseconds, if a RING_OFF event 1256 occurs, the CO has aborted the call and the process returns to the Idle state 1210. If the 300 millisecond timer expires, a TIMEOUT event 1252 occurs indicating that the incoming ring could be a ping, so a 400 millisecond timer is started at 1254, and the process enters the Ping End state 1260.

Recalling that the ping ring duration is approximately 500 milliseconds, if a RING_OFF event 1262 is received prior to the expiration of the 20 millisecond timer, a ping ring may have been received, and in response, a 4.1 second timer is started at 1264 and then the process enters the Wait No Ring state 1270. If the TIMEOUT event 1266 occurs, the incoming ring is greater than the length of a ping ring and the process returns to the Idle state 1210. For example, this might occur if a new call arrived and the CO has generated a standard incoming ring whose duration would exceed the total of the 700 milliseconds from the RING_ON event 1242 to the Ping End state 1260.

The purpose of the Wait No Ring state 1270 is to qualify the incoming ring as a ping ring. If a new RING_ON event 1274 occurs prior to the expiration of the 4.1 second timer, the ring is not a ping ring and may be part of a new normal ring cadence. This is so since a ping ring is followed by a period of silence greater than the 4.0 second off time of a normal ring cadence. If a new RING_ON event 1274 is received, the process returns to the Idle state 1210. If the 4.1 second timer expires, a TIMEOUT event 1272 occurs and the process enters the Screening state machine via the START_CALL_SCREENING:AUDIO event 1280. The balance of the CO call screening method is identical to the CPE method discussed in detail above.

One advantage of the present invention is the ability of the user to perform the call screening function automatically, eliminating the need for entering a code or employing specialized TAD equipment. This flexibility is gained through the use of a series of state machines contained in memory in the form of operational program code of either a CPE device at the user's premises or in an equipment located at the CO.

A second advantage of the present invention is the ability to screen calls from any CPE at the user's premises eliminating the need to be physically close to the CPE device doing the screening. The method of the present invention employs the necessary state machines in operational code to allow the user to accomplish the screening activity from any CPE including base speakerphone type CPEs or cordless type CPEs.

A third advantage of the present invention is the ability of the user to choose between standard screening wherein the user can listen to the calling party without the calling party's knowledge, allowing the calling party to leave a message in voicemail, or to intercept the call at any time from any CPE in the user's premises without the need to enter a special code. This advantage of the present invention is a significant improvement over earlier methods that did not allow such flexibility for the user.

A fourth advantage of the present invention is that no special equipment is required. By eliminating the need for PBX equipment or live attendants, the method of the present invention is very economical. The necessary state machines may be placed in memory that already exists in the majority of user CPE equipments at this time.

A further economic advantage is gained by the fact that the necessary operational code containing the state machines need be located in only one user CPE, thus a fifth advantage of the present invention is simplicity of adding the call screening function to extension locations within the user premises. No costly wiring is required as with prior art methods.

A sixth advantage of the present invention is that it may be implemented in any system having the appropriate hardware and software. Thus the method of the present invention may be used with a PC configured for telephony operation, or a PBX installed in an office as well as the more general application to CPEs such as telephones and TADs.

What is claimed is:

1. A memory to provide a cordless telephone used by a called party with a call screening function, the memory comprising:

instructions for receiving an incoming telephone call from a calling party;

instructions for connecting the incoming telephone call to a voicemail service of the called party;

instructions for establishing a three-way connection between the calling party, the called party, and the voicemail service;

instructions for muting the cordless telephone so that the called party may listen as the calling party leaves a message on the voicemail service without the calling party having knowledge that the called party is listening; and instructions for providing a two-way connection between the calling party and the called party upon interception of the incoming telephone call by the called party, wherein the instructions for receiving, connecting, establishing, and muting are configured to execute without human intervention.

2. A method for screening an incoming telephone call received by a called party on a cordless telephone, comprising:

receiving an incoming telephone call from a calling party;

connecting the incoming telephone call to a voicemail service of the called party;

establishing a three-way connection between the calling party, the called party, and the voicemail service;

muting the cordless telephone so that the called party may listen as the calling party leaves a message on the voicemail service without the calling party having knowledge that the called party is listening; and providing a two-way connection between the calling party and the called party upon interception of the incoming telephone call by the called party, wherein the receiving, connecting, establishing, and muting are executed without human intervention.

* * * * *